(12) United States Patent
LaFollette et al.

(10) Patent No.: US 7,432,456 B2
(45) Date of Patent: Oct. 7, 2008

(54) SYSTEM AND METHOD FOR PROVIDING CERTIFIED WEIGHING SERVICES AT REMOTELY ATTENDED SCALES

(75) Inventors: Gary D. LaFollette, Blue Grass, IA (US); Carey W. Howard, Lowden, IA (US); Eric J. Ruud, Hampton, IL (US); Jon R. Ketelsen, Port Byron, IL (US); Phyllis J. Vaughn, Walcott, IA (US); Thomas Luke, Parkville, MO (US); James Havers, Chagrin Falls, OH (US); Richard Desrochers, Lyndonville, VT (US); John Smith, McIndoe Falls, VT (US); Douglas Roberts, Lyndonville, VT (US)

(73) Assignee: Cat Scale Company, Walcott, IA (US)

( * ) Notice: Subject to any disclaimer, the term of this patent is extended or adjusted under 35 U.S.C. 154(b) by 197 days.

(21) Appl. No.: 10/934,839

(22) Filed: Sep. 3, 2004

(65) Prior Publication Data

US 2006/0052980 A1 Mar. 9, 2006

(51) Int. Cl.
*G01G 19/02* (2006.01)
(52) U.S. Cl. ...................................... 177/133
(58) Field of Classification Search ......... 177/132–133, 177/25.13; 702/173–174
See application file for complete search history.

(56) References Cited

U.S. PATENT DOCUMENTS

| | | | |
|---|---|---|---|
| 2,864,943 A | 12/1958 | Schultz | |
| 3,842,922 A | 10/1974 | Fagin et al. | |
| 3,949,822 A | 4/1976 | English et al. | |
| 4,192,394 A * | 3/1980 | Simpson | 177/45 |
| 4,462,045 A * | 7/1984 | Norris | 348/159 |
| 4,465,151 A * | 8/1984 | Gorman et al. | 177/133 |
| 4,605,081 A | 8/1986 | Helmly, Jr. et al. | |
| 4,728,922 A | 3/1988 | Christen et al. | |
| 4,922,339 A * | 5/1990 | Stout et al. | 348/143 |
| 4,992,775 A | 2/1991 | Castle et al. | |
| 5,076,375 A | 12/1991 | Dillon et al. | |
| 5,426,282 A * | 6/1995 | Humble | 235/383 |
| 6,175,382 B1 * | 1/2001 | Mohr | 348/150 |
| 6,580,037 B1 | 6/2003 | Luke | |
| 2003/0015353 A1 | 1/2003 | Kroll et al. | |

OTHER PUBLICATIONS

Cardinal Scales: Unattended weighing operations; cardinalscale.com/unattendedoperation.htm; Mar. 5, 2004.*

(Continued)

*Primary Examiner*—Felix O. Figueroa
*Assistant Examiner*—Sean Kayes
(74) *Attorney, Agent, or Firm*—Harness, Dickey & Pierce

(57) ABSTRACT

A remotely attended scale system for providing certified weighing services for a vehicle. The system having a plurality of weigh sites located remotely from one another and a weighmaster located at a central location. The weighmaster verifies proper placement of the vehicle upon the scale, may facilitate a normal weighing process, and may interact with the driver before issuing a certificate of weight. The method of the present invention includes steps of initiating a weigh cycle, delegating a weighmaster located at a central location for the weigh cycle, establishing communication between a driver and the weighmaster, weighing the vehicle, downloading weight information to the central location, and dispensing a certificate of weight at the weigh site.

33 Claims, 8 Drawing Sheets

OTHER PUBLICATIONS

Cardinal Scales :: cardinalscale.com/PDF/UnattendedOperation.pdf; Jul. 7, 2006.*

Cardinal 777 Programmable Digital Indicator Controller Meter :: cardinal-detecto.centralcarolinascale.com/777.htm; Jul. 7, 2006.*

* cited by examiner

SYSTEM AND METHOD FOR PROVIDING CERTIFIED WEIGHING SERVICES AT REMOTELY ATTENDED SCALES

BACKGROUND OF THE INVENTION

The present invention relates generally to a scale system for providing certified weighing service and specifically to a remotely attended scale.

Trucks and other vehicles are weighed on public weigh scales for commercial purposes including transactions based on weight and to compare actual weights to state limits of weight that do not require overweight permits or restricted access routes. Most states charge and collect significant fines from truckdrivers for overweight penalties to prevent harm and promote safety issues related to its roads and bridges.

While the maximum allowed weight varies, the common standard is 80,000 pounds gross vehicle weight. Weight is usually calculated in two measurements: axle weight, the amount of weight carried by each axle and gross weight, the combined weight of all the axles.

The penalties for a vehicle not falling within the weight guidelines that each state has in place for its road system are often severe. Therefore, a certified weighing service has been developed which permits a driver the ability to pre-weigh their load prior to encountering a state monitoring site. The certified weighing services are typically at truck stops which weigh the trucks after they have been fully loaded with fuel. If the certified weighing service indicates that the truck and trailer are overweight, the driver may respond by removing cargo from the trailer and/or readjusting the weight on the trailer bed. The certified weighing service verifies the weight of the vehicle and issues a certificate of weight to the driver. Although the states do not unconditionally recognize these certified weigh receipts, should the driver be in violation of a state's weight guidelines, the certifying company may pay the overweight fine or send a representative to appear in court with the driver as an expert witness.

These certifying scales are typically located at truck stops which have a staff manning them onsite or at freestanding stops which have a full-time attendant. Operating these certifying scales thus can be labor intensive and training intensive.

Another problem found in commercial certified weighing is that scales are not located in remote areas. It would be beneficial to the driver if scales were located in areas immediately before and after entry into a state that may have different weight guidelines, in less traveled parts of the country, or in places that do not have a conventional truck stop facility.

Therefore, one objective of the present invention is to overcome the problems associated with the prior art.

A further objective of the present invention is to provide a certified weighing service for a weigh site remote from a weighmaster.

A further objective of the present invention is to provide the remote weigh sites with at least one sensor to indicate the position of the vehicle relative to the scale so that a weighmaster may verify proper vehicle placement upon the scale.

A further objective of the present invention is to provide a weigh site in a remote location that may be verified by a weighmaster such that the weighmaster may issue a certificate of weight.

A further feature of the present invention is to permit a driver of a tractor/trailer or other vehicle the ability to process a payment at the weigh site to compensate the certified weighing service for use of their weigh sites.

A further objective of the present invention is to enable weigh sites to be located in remote areas that would have difficulties in providing an on-site weighmaster.

A further objective of the present invention is to provide a system which improves the quality of scale measurement by having a central location of weighmaster as opposed to a truck stop operator who may not be carefully monitoring the weighing operation or pay close attention to the scale's operation.

A further objective of the present invention is to be able to receive information from a plurality of weigh sites and to be directed towards a centrally located weighmaster.

Additionally, an objective is to enable the division of the workload of the plurality of work sites to a plurality of weighmasters.

A further objective of the present invention is the provision of a system and method which is relatively inexpensive to operate and efficient in use.

One or more of these and/or other objectives will become apparent from the specification and claims that follow.

SUMMARY OF THE INVENTION

According to one aspect of the invention, a system provides certified weighing services at remotely attended scales. The system includes a number of weigh sites located remotely from one another. Each of the weigh sites has a scale capable of weighing a vehicle that may be a tractor/trailer. The weigh sites have at least one sensor to indicate the location of the vehicle relative to the scale. A remotely attended scale system also has at least one weighmaster located at a central location that verifies proper vehicle placement upon the scale and facilitates a normal weighing process. At the conclusion of the weighing process, the weighmaster issues a certificate of weight. The remotely attended scale system is complimented by a driver interface for communication between a driver at the weigh site and the weighmaster.

According to another feature of the present invention, a remotely attended scale system has a control center capable of distributing one or more of the weigh sites to a weighmaster when the vehicle is being weighed.

According to another feature of the present invention, the remotely attended scale system may utilize video cameras to indicate the location of the vehicle relative to the scale.

According to another feature of the present invention, the remotely attended scale system may utilize a payment interface that includes a credit or debit card reader (i.e. a magnetic strip reader) and/or a currency acceptor.

According to another aspect of the invention, a method provides certified weighing services at a remotely attended scale. The method including the steps providing a plurality of weigh sites located remotely from one another for weighing a vehicle, initiating a weigh cycle at one of the weigh sites, delegating a weighmaster located at a central location for the weigh cycle, establishing communication between a driver and the weighmaster, verifying proper placement of the vehicle upon the scale using sensors, weighing the vehicle, downloading weight information to the central location, and dispensing a certificate of weight at the weigh site.

According to another feature of the present invention, the method includes the step selecting from a plurality of weigh masters one with the ability to wait on a customer.

According to another feature of the present invention, communication may be established between the driver and the weighmaster through video and audio communication.

DETAILED DESCRIPTION OF THE PREFERRED EMBODIMENT

Figure 1:
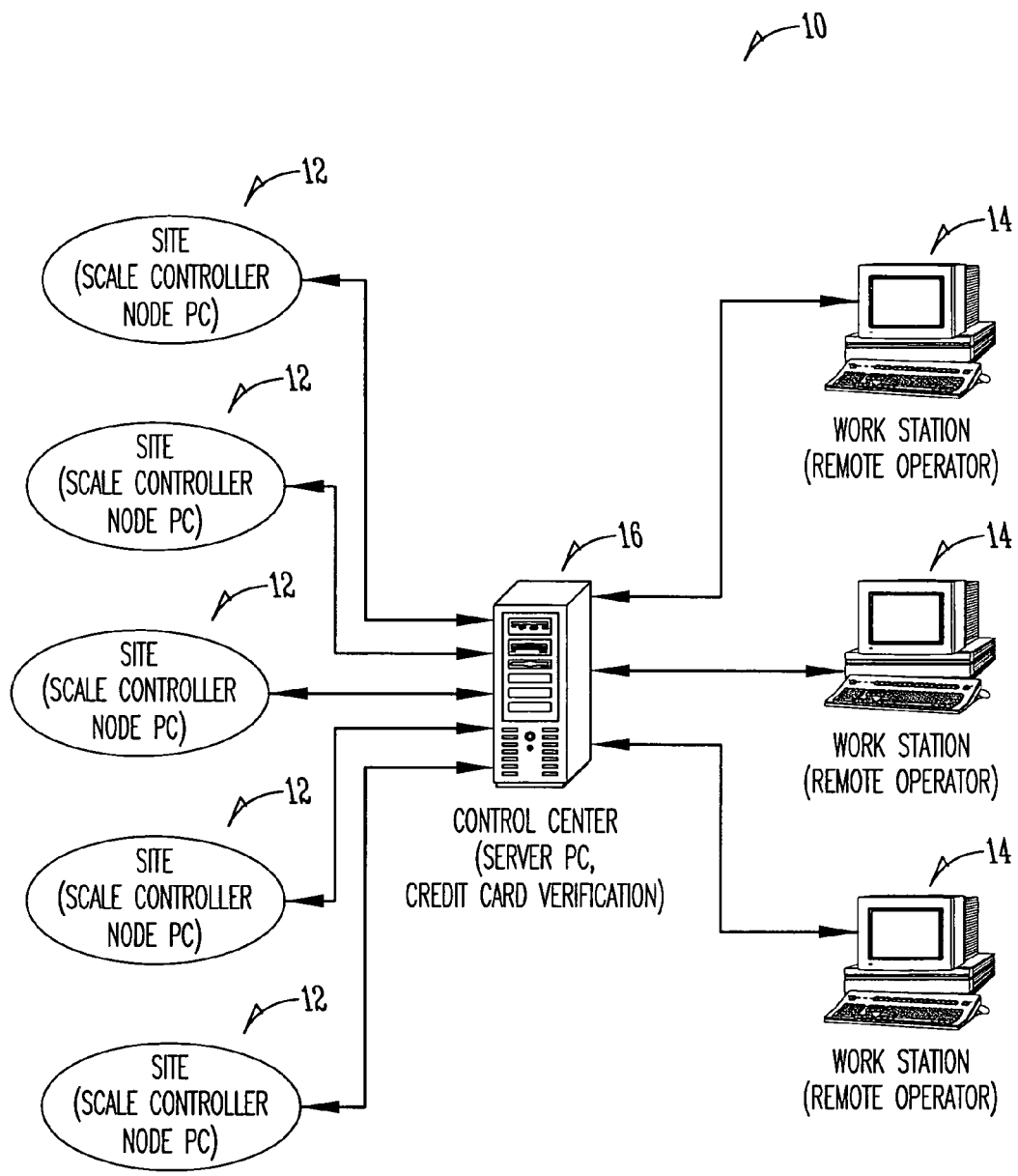
FIG. 1 is a flow diagram of the remotely attended scale system of the present invention.

The present invention relates to a system and method for providing certified weighing services at remotely attended scales. As seen in FIG. 1, the remotely attended scale system is referred to generally by the numeral 10.

The remotely attended scale system 10 has weigh sites 12 that may be located in areas where a conventional truck stop facility does not exist or one in which providing a full-time attendant on location would be cost prohibitive due to staffing and training concerns. Alternatively, the weigh site 12 may be located at a truck stop that is currently fully attended but converted to be a weigh site 12 that is remotely attended to benefit the truck stop by reducing labor and training.

The remotely attended scale system 10 has a weighmaster at work station 14. Information from the weigh sites is transferred to the work station 14 through a computer network. The weighmaster communicates with the weigh site 12 through work station 14. One work station 14 can handle a number of weigh sites 12. Alternatively, a number of work stations may handle the number of weigh sites 12. A control center 16 utilizing a server may be used to receive information from the weigh sites 12 and distribute them to work stations 14 in an organized manner. The server 16 may also serve to verify credit or debit cards and perform other functions that don't require the personal attention of a weighmaster at weigh station 14.

Figure 2:
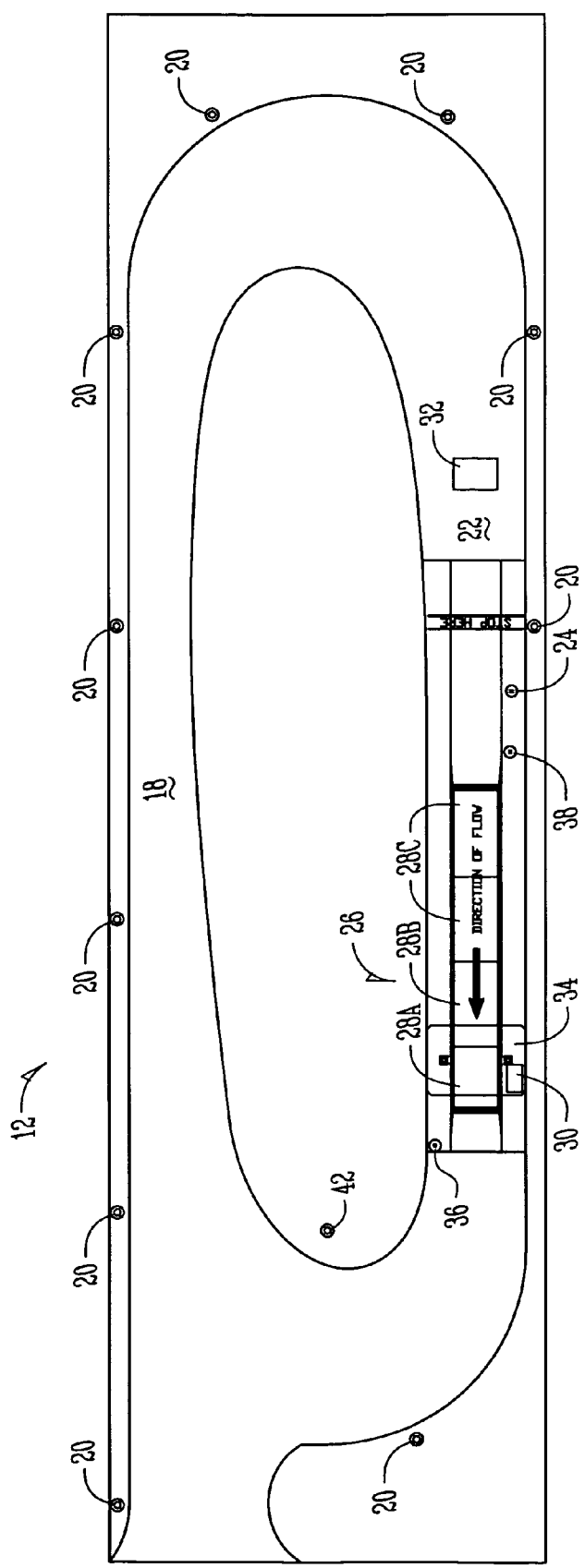
FIG. 2 is a top plan layout of the weigh site of the present invention.

As seen in FIG. 2, a weigh site 12 has a drive path 18 surrounded by perimeter lights 20. The truck stops at an entry location 22 until instructional signage 24 indicates to the driver that he/she may enter scale 26. The scale 26 is commonly a load-cell system with a strain gauge embedded in it, a column type sensing element with strain gauges attached to them, or a piezoelectric system which uses a series of piezoelectric sensors. Each of these systems transmits an electrical current to a junction box typically housed within a kiosk 30. The scale 26 may have one or more platforms 28 permitting several different weighment types. Typical weighment options provided to a driver may include standard, reweigh, split axle, and double trailer.

There are different types of vehicle scale equipment that may be used, these include but are not limited to: 1) a one-axle weighing system which uses a single scale and requires a driver to stop each time a set of wheels is on the scale and once all axles have been weighed a total added together; 2) a one-stop scale which uses a series of platforms 28 so that the entire vehicle can be weighed at once, the scales typically connected to a single electronic controller that automatically combines actual weights to get the gross weight; or 3) a weigh-in-motion system which uses sensors to calculate the weight per axle as a vehicle drives over the sensor pad. The weigh-in-motion method does not need for the vehicle to come to a complete stop while on the scales.

Prior to the driver entering the scale, he/she drives over an inductive loop 32 at the approach area indicating to a scale controller 66 to initialize zeroing the scale. The driver 30 can then pull onto the scale platforms 28A-C such that they may register a weight upon the scale.

A canopy 34 covers the kiosk 30 and the portion of the scale under which the tractor cab will be positioned and where the driver will exit the tractor. Thus, the canopy 34 protects both the kiosk and the driver from weather elements.

Figure 3:
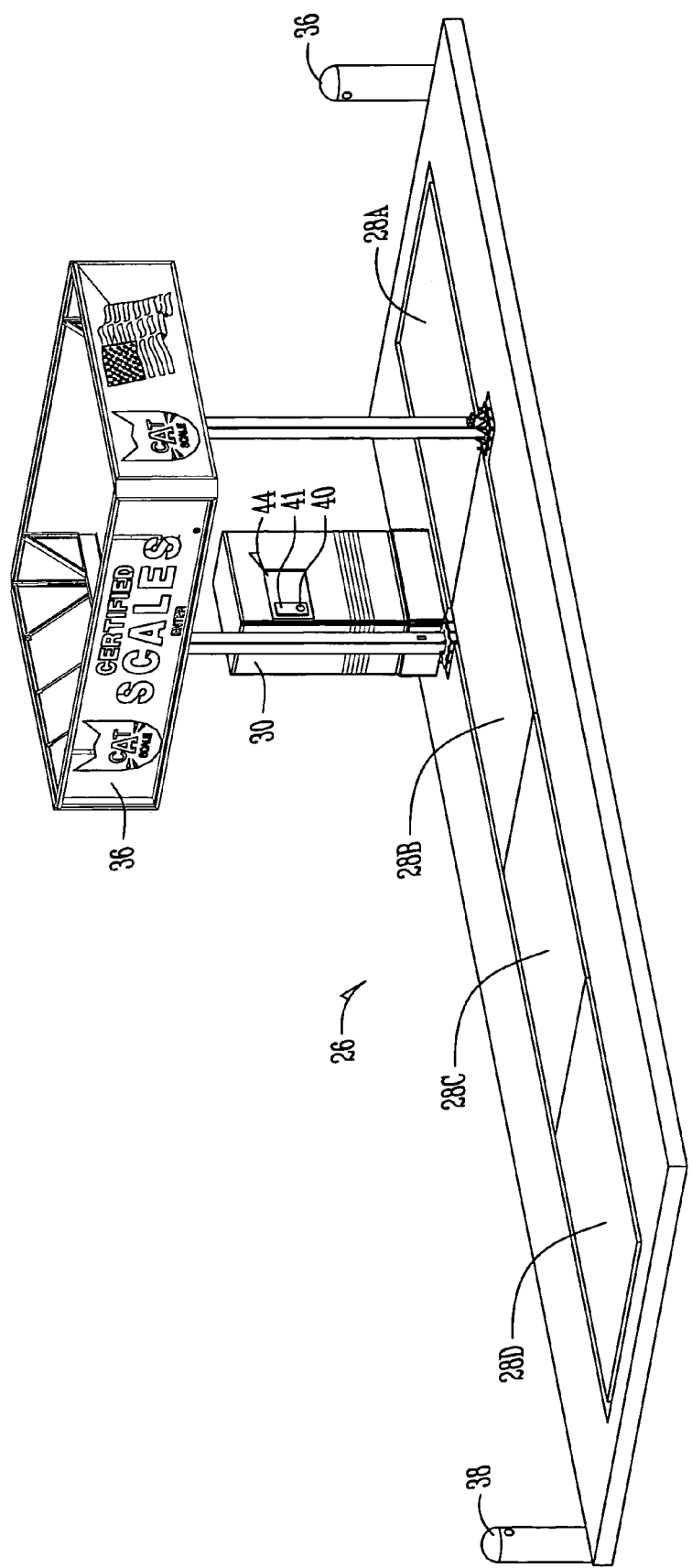
FIG. 3 is a perspective view of the scale of the present invention.

As illustrated in FIG. 3, platform 28A is designed to weigh the steer axle, platform 28B is designed to weigh the drive axle, platform 28C is designed to measure the weight of the trailer axle(s). Alternatively, other configurations of platforms 28 are available.

At least one placement sensor is provided to confirm proper placement of the vehicle and/or trailer. As seen in FIGS. 2 and 3, a front camera 36 and a rear camera 38 are at opposite corners of the scale 26 to provide visual confirmation of proper placement of the vehicle and trailer. Proper placement is essential for verifying and certifying the weight of the vehicle and trailer. A side camera 40 may be located on kiosk 30 and provide confirmation of the truck and trailer placement upon platforms 28A-C. The side camera 40 may also be used to collect digital images of the driver. A surveillance camera 42 is a mounted from a pole overlooking the site. Cameras 36, 38, 40 and 42 may be either color or black and white. The side camera 40 affixed to the kiosk would have the ability to pan and tilt for ease of identification of the driver and the vehicle being weighed.

Alternatively, the placement sensor may be a light beam system such as an infrared light beam system. Still alternatively, the placement sensor may be an in-ground sensor that recognizes the weight of a vehicle. Once such in-ground sensor using fiber optics embedded in the concrete and spaced at intervals. Still alternatively, the placement sensor may be a camera imaging system that recognizes the scale footprint and identifies proper placement of the vehicle upon the footprint.

Figure 4:
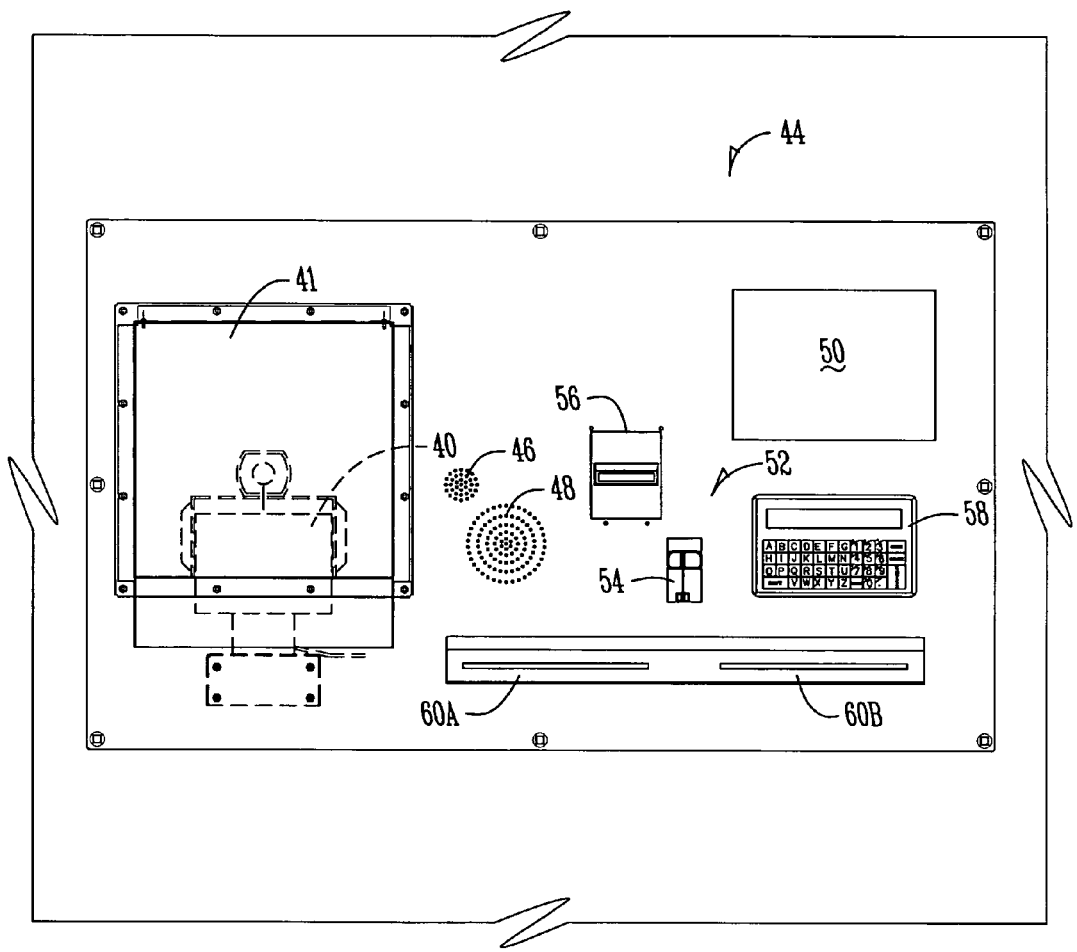
FIG. 4 is a front view of the driver interface on a kiosk of the present invention.

As seen in FIG. 4, a front view of the driver interface and its components are shown. The camera 40 is provided with pan, tilt, and zoom features. The camera 40 is positioned behind a camera window 41. The driver interface 44 also includes a microphone 46 and a speaker 48 that permits verbal communication from a driver at the weigh site 12 with the weighmaster at work station 14. The driver interface 44 also includes a video display that facilitates the verification of information by the weighmaster and displays questions from the weighmaster. The video display 50 as illustrated is a color TFT VGA display. The display 50 is connected to a node PC 62 within the kiosk via a VGA cable.

The driver interface also includes a payment interface 52 that may be a credit or debit card reader 54, a currency acceptor 56, or a combination credit or debit card reader and currency acceptor. The credit or debit card information may be entered using the credit or debit card reader 54 which reads the magnetic strip on the back of the credit or debit card, manually using an alpha numeric key pad 58, or vocally from the driver to the weighmaster.

A user interface key pad 58 is used for the driver to enter information regarding their vehicle, truck, trailer and identification information. Two printers 60A and 60B may be used to provide two full scale tickets. These printers as illustrated are Telpar Model NTP-2283 8.5 inch cut-tape thermal printers. A rain guard is provided over each to protect the printers. Each printer is fed from an 8 inch diameter spool of thermal paper to minimize maintenance issues.

The driver interface may also include a help button. The system can be operated without any communication between the driver and the weighmaster. The help button is provided to allow the driver to initiate a dialog with the weighmaster that facilitates operation of the system.

Figure 5:
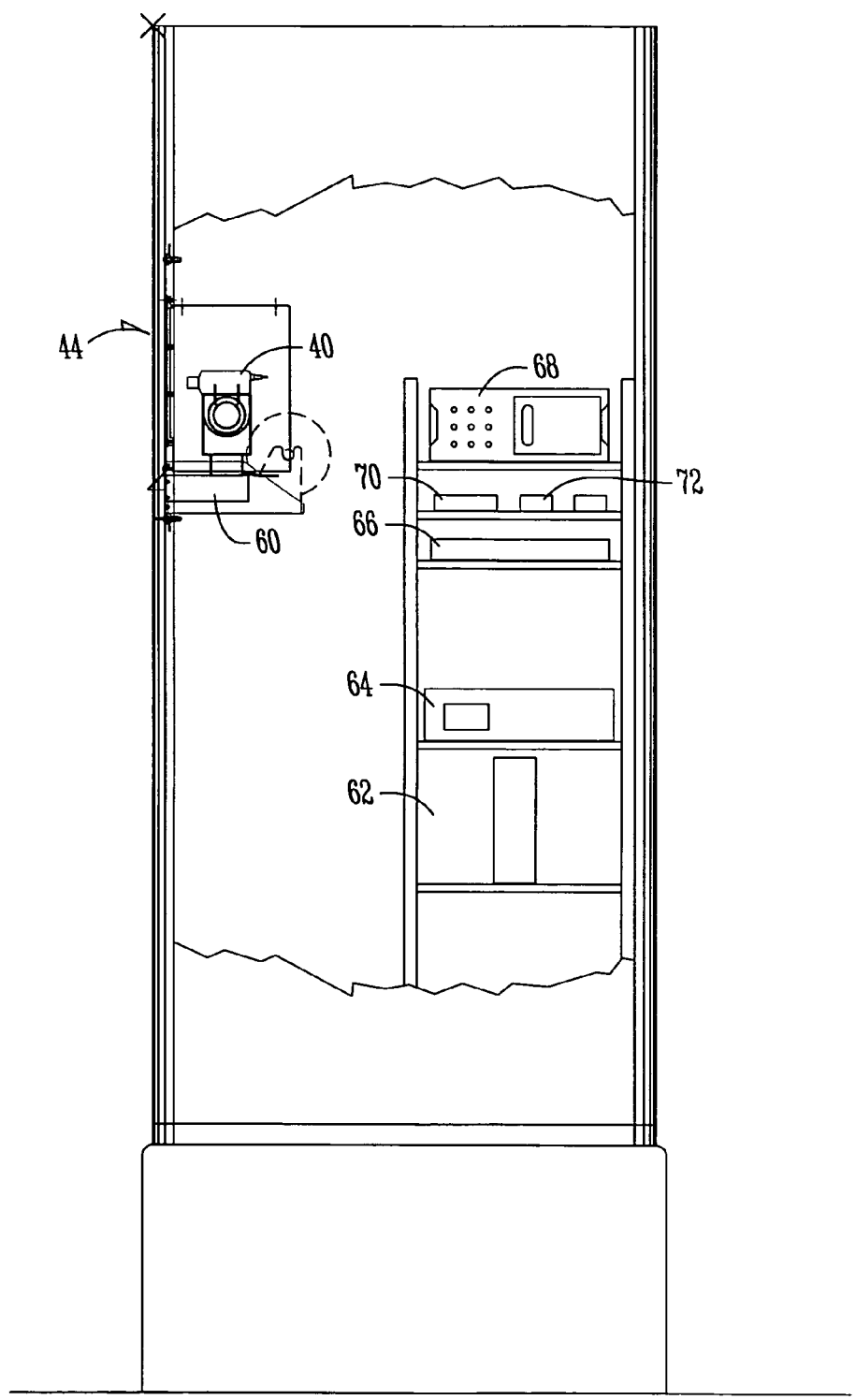
FIG. 5 is a side view of the kiosk used in the present invention having an internal portion exposed.

As seen in FIG. 5, the inside of the kiosk 28 is shown with its internal hardware. The kiosk 28 is fully climate controlled and accessible only to authorized personnel. To the front of the kiosk is positioned the driver interface including the side camera 40 and printers 60. Housed in a back portion of the kiosk 28 is the node PC 62 that is designed to handle the card reader and associated information transfer, to drive the remote display, and to run the remote site node program. As illustrated, the node PC 62 is a Dell® Mini-Optiplex computer. A scale controller 64 is a custom version of the Fairbanks IND-2600 Intalogix controller. The controller 64 receives input from the platforms 28A-C and communicates them to the node PC 62 through a network connection. A T1 router 66 is provided to connect the node PC 62 to the work station 14 and alternatively the server 16 via a high speed data link.

Additionally, a digital video recorder 68 is housed in the kiosk 28 that permits recording of the four different cameras 36, 38, 40, and 42. As illustrated the digital video recorder is a Toshiba Surveilex KV-KLR960 GB unit.

A network video server 70 provides video from the three different positioning cameras 36, 38, and 40 to the weighmaster. These cameras allow the weighmaster to visually verify vehicle placement as well as provide security monitoring. Communication with the driver is handled through an audio module 72. As illustrated, the audio module 72 is coupled with the video server 70 to allow bi-directional half-duplex audio with good clarity. The audio module 72 is linked with a speaker 48 and microphone 46 located on the driver interface 44. These two modules 70, 72 interact with the work station 14 to communicate with the weighmaster.

Figure 6:
FIG. 6 is a certificate of weight issued by the present invention.

As seen in FIG. 6, a scale ticket 74 is issued from the printer 60. The scale ticket 74 includes each axle weight and the gross weight total. The scale ticket 74 is guaranteed such that if the driver after receiving a legal weight certificate from one of company's scales and then receives an overweight fine from a state the driver will be reimbursed for the cost of the overweight fine or have a scale company representative appear in court with the driver as an expert witness. The scale ticket 74 is generally referred to as a certificate of weight. The certificate of weight may be a certified weight which is certified by a weighmaster, a weighmaster certificate as commonly referred to in California, or a document that has been issued at weigh sites not regulated by a national or state governing body. The scale ticket 74 meets the requirements of the national or state governing body. Additionally, the scale ticket 74 may be used by those concerned about the maximum weight of their vehicle, those transporting grain or other commodities, and/or those weighing their vehicles, such as moving vans, to calculate a charge to their clients moving.

Figure 7:
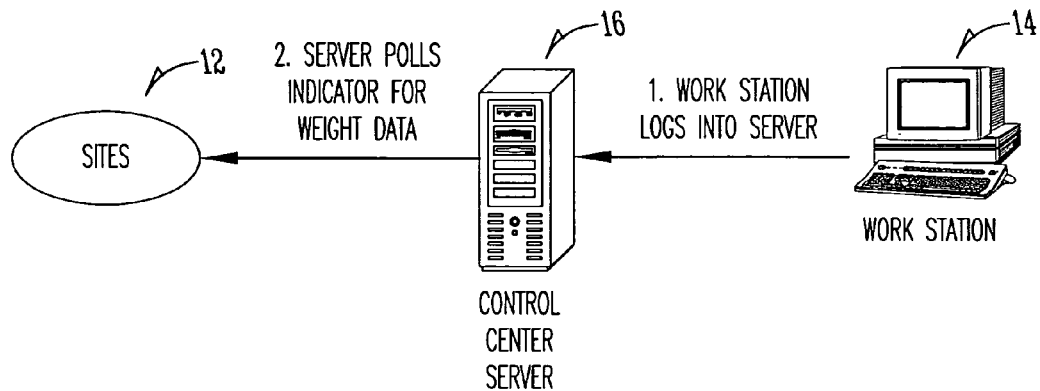
FIG. 7 is a flow diagram of the idle/startup operations of the method of the present invention.
Figure 8:
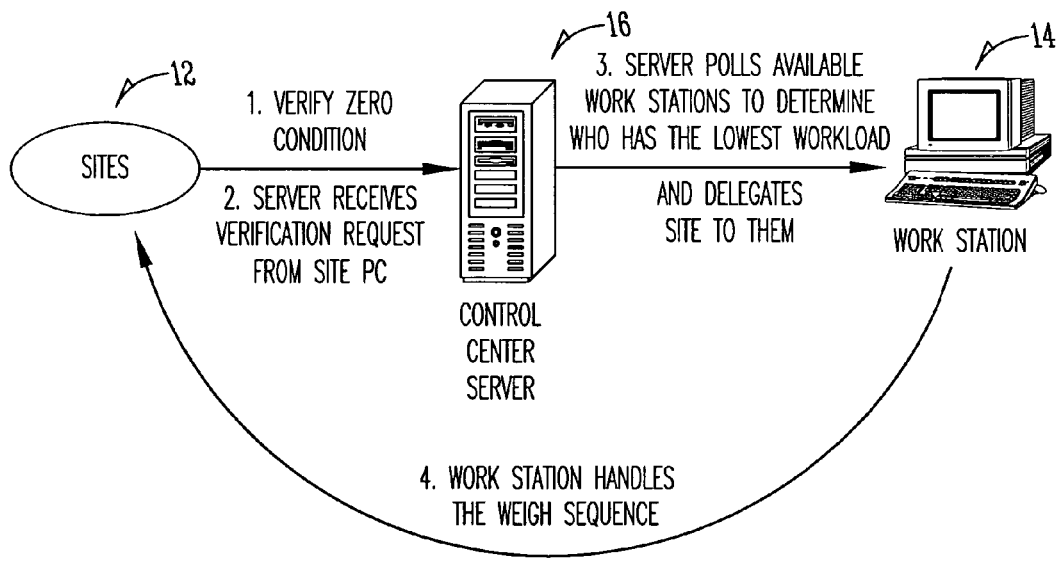
FIG. 8 is a flow diagram of the delegation operation step of the present invention.
Figure 9:
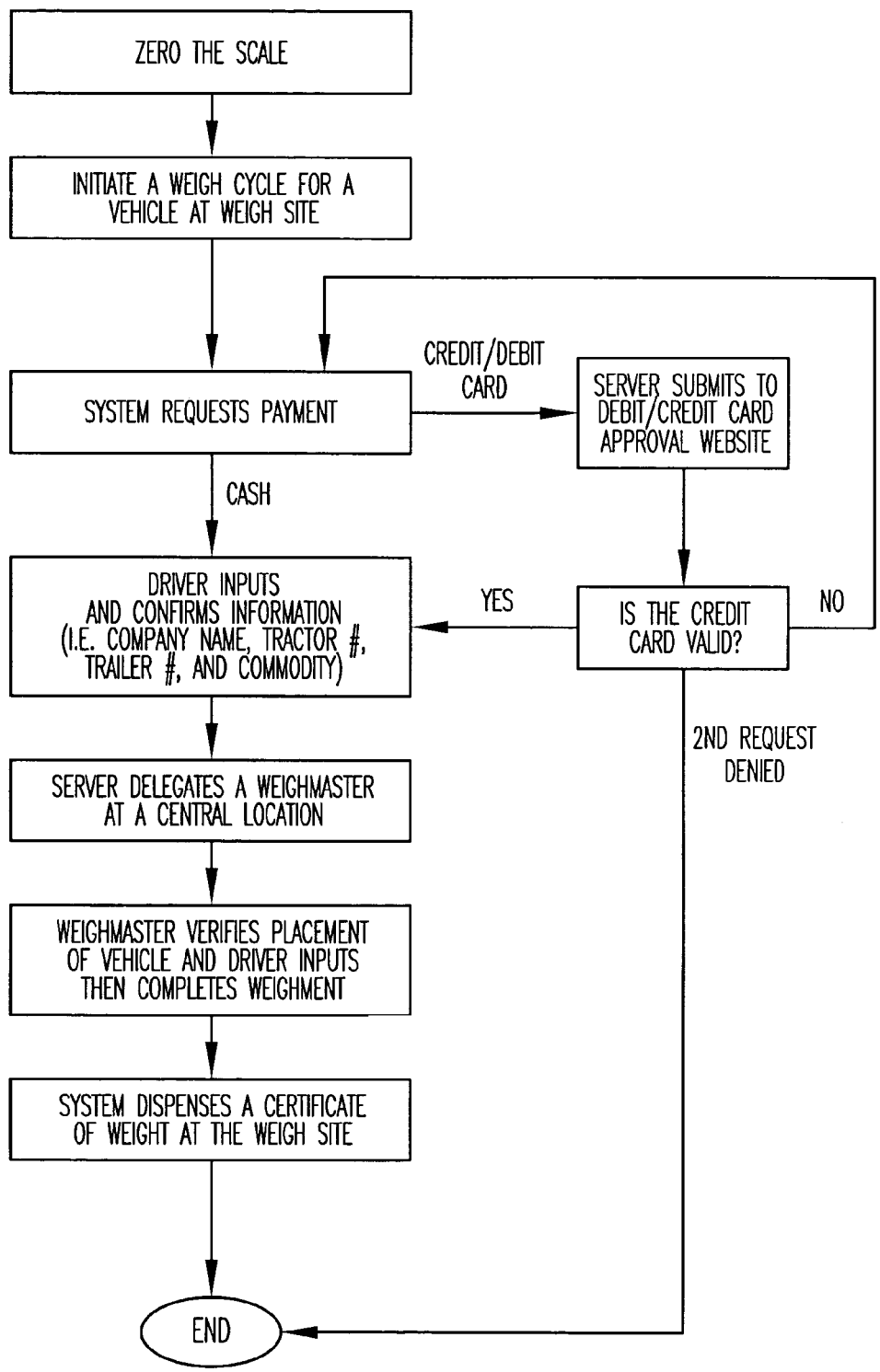
FIG. 9 is a flow diagram of a method of the present invention.

FIGS. 7-9 detail the cycle of operation of the present invention. Initially, as seen in FIG. 7, the system is idle and must be started. The weighmaster at the work station logs into the server and then the server polls the site 12 for weight data. Should no weight data be received from the site, the work station 14 remains idle. During this start up phase, one work station 14 may be logged into the server or a plurality of work stations 14 depending upon the amount of work flow. As illustrated in FIG. 7, the site 12 is in contact with the server 16. When a site 12 first comes on line a similar logging into the server 16 is initiated.

Although the person facilitating the system's operation is generally referred to as a weighmaster, the person may also be referred to as a public weigher and/or a deputy weighmaster. The weighmaster may therefore be able conform to the regulations of a national or state governing body.

When a vehicle approaches the scale 26, it pulls over an inductive loop 32 and the scale controller 64 verifies a zero condition. If for some reason the scale controller 64 is unable to verify a zero condition, a message will be displayed saying the scale 26 was unable to reach a zero condition and for the driver to exit the scale 26. The driver then has the option of pulling around and attempting another weighment. The vehicle then pulls onto at least one of platforms 28A-C and causes a weight to register with the controller 64. If the weight passes a threshold weight, site 12 as seen in FIG. 8 initiates a data link to the server PC 16. As seen in FIG. 8, this is the first step of the delegation operation.

As seen in FIG. 9, a weigh cycle is initiated from the remote site. The system then prompts the driver to insert his/her payment to begin the transaction. The driver, using a credit or debit card, has the card information sent to the server PC 16 and preauthorized for a currency amount. The system then asks the driver for the driver's billing zip code to finish the preauthorization. If the card is declined, the transaction may be aborted.

The system determines a weighment type, then proceeds with a normal weighment process. The system then asks the driver for his/her company name, tractor number, trailer number(s), and commodity. The VGA display 50 also prompts the driver for the information as it is being requested.

As the information is entered by the driver, the information is displayed on the remote display 50 for driver verification. The system will then ask if the information displayed is correct and give the driver the option to have any incorrect information edited. If any of the information needs to be edited, it can be done at this point without aborting the transaction.

When the driver indicates the information is correct, the weighmaster will verify position, then authorize initiation of a print command on the work station 14 which will then send the vehicle information to the controller 64 at the remote site. The controller 64 will then take the vehicle information, add the weights to it, and issue a print command to the thermal printer 60. Each transaction will print two receipts.

At the time of the print command, a charge will be issued to the customer's credit or debit card and a log of the transaction will be stored on the server PC 16.

After issuing the two weight certificates 74, the driver will be prompted by the system to exit the scale. When the driver has exited and the controller verifies a zero condition, the scale is ready for another weighment to occur.

A method and system for providing certified weighing surfaces at remotely attended scales has been disclosed. The present invention is not limited to a particular method, step, procedure, or system component. Instead, the invention contemplates that numerous variations may be used as may be appropriate to a particular use. For example, the present invention contemplates variations in the particular structures, configurations, and methodologies used, the type of weighing system used, the manner in which computers are networked, variations in hardware and software, and other variations that may be appropriate in particular circumstances, applications, or environments.

What is claimed is:

1. A remotely attended scale system for providing certified weighing services for a vehicle, comprising:
   a plurality of weigh sites located remotely from one another, each weigh site having a scale capable of weighing the vehicle and at least one sensor to indicate the location of the vehicle relative to the scale;
   the at least one sensor including a first camera and a second camera located at opposite ends of the scale to provide visual confirmation of proper vehicle placement, and a third camera located on a transverse side of the scale between the opposing sides of the scale, the at least one sensor to provide a weighmaster located at a central location associated with the plurality of weight sites with verification of proper vehicle placement in facilitation of a normal weighing process, wherein at least two of the first, second, and third cameras are located proximate to the scale and oriented to provide a field of view restricted substantially to a vehicle's position relative to the scale;
   a certificate of weight unit capable of dispensing a certificate of weight by the weighmaster at the weigh site, the certificate of weight identifying the weighmaster, the vehicle and the gross weight of the vehicle;
   a driver interface for communication between a driver at the weigh site and the weighmaster at the central location allowing two-way real-time vocal communication between the weighmaster and a user at one of the plurality of weigh sites; and
   at least one video display at the central location adapted to display video from the at least one sensor for the weighmaster to verify proper vehicle placement.

2. The remotely attended scale system of claim 1 further comprising a control center adapted for of distributing responsibility for one of the weigh sites weighing the vehicle to the weighmaster.

3. The remotely attended scale of claim 1 wherein the scale may be for a weighment type from the group consisting of standard, reweigh, split axle, and double trailer.

4. The remotely attended scale system of claim 1 wherein the weighmaster utilizes one of the cameras to receive a visual image of a driver of the vehicle.

5. The remotely attended scale system of claim 1 wherein the driver interface includes a camera for video communication from a driver to the weighmaster.

6. The remotely attended scale system of claim 1 wherein the driver interface includes a microphone for verbal communication from a driver at the weigh site to the weighmaster.

7. The remotely attended scale system of claim 1 wherein the driver interface includes a speaker for verbal communication from the weighmaster to a driver at the weigh site.

8. The remotely attended scale system of claim 1 wherein the driver interface includes a video display to facilitate the verification of information.

9. The remotely attended scale system of claim 1 wherein the driver interface includes a payment interface.

10. The remotely attended scale system of claim 9 wherein the payment interface includes a magnetic strip reader.

11. The remotely attended scale system of claim 9 wherein the payment interface includes a currency acceptor.

12. The remotely attended scale system of claim 1 wherein the driver interface includes a printer for issuing a certificate of weight.

13. The remotely attended scale system of claim 1, wherein the first, second and third cameras are all located below a height of a vehicle to be weighed.

14. The remotely attended scale system of claim 13, wherein the first, second and third cameras are located and configured to provide a weighmaster an image of at least part of the vehicle and scale with sufficient clarity and field of view to enable the weighmaster to determine whether the vehicle is appropriately positioned on the scale.

15. A remotely attended scale system for providing certified weighing services for a vehicle, comprising:
   a plurality of weigh sites located remotely from one another, each weigh site having a scale capable of weighing the vehicle and a plurality of image sensors including a first camera and a second camera located at opposite ends of the scale to indicate the location of the vehicle relative to the scale, and a third camera located on a transverse side of the scale between the opposing sides of the scale, the first, second and third cameras all located proximate to the scale and below a height of a vehicle to be weighed;
   a control center located at a central location in communication with the plurality of sites and capable of distributing weight and vehicle location from each activated weigh site to one of a plurality of weighmasters;
   the plurality of image sensors adapted to allow the weighmasters to verify proper vehicle placement in facilitation of a normal weighing process; and
   a guaranteed certificate of weight issued and dispensed by a weigh unit at the weigh site, wherein the guaranteed certificate warrants against a user of the scale system being fined for driving an overweight vehicle and wherein the guaranteed certificate of weight identifies one of the weighmasters who certifies the weight.

16. The remotely attended scale system of claim 15 further comprising a driver interface for communication between a driver at the weigh site and the weighmaster.

17. The remotely attended scale system of claim 16 wherein the driver interface includes a microphone for verbal communication from a driver at the weigh site to the weighmaster.

18. The remotely attended scale system of claim 16 wherein the driver interface includes a speaker for verbal communication from the weighmaster to a driver at the weigh site.

19. The remotely attended scale system of claim 16 wherein the driver interface includes a video display to facilitate the verification of information and view questions from the weighmaster.

20. The remotely attended scale system of claim 16 wherein the driver interface includes an alpha numeric keypad to communicate between the weigh site and weighmaster.

21. The remotely attended scale system of claim 16 wherein the driver interface includes a payment interface.

22. The remotely attended scale system of claim 16 wherein the payment interface includes a magnetic strip reader.

23. The remotely attended scale system of claim 22 wherein the payment interface includes a currency acceptor.

24. The remotely attended scale system of claim 16 wherein the driver interface includes a printer for issuing a certificate of weight.

25. The remotely attended scale system of claim 15, wherein at least two of the first, second, and third cameras are located proximate to the scale and oriented to provide a field of view restricted substantially to a vehicle's position relative to the scale.

26. A method for providing certified weighing services at remotely attended scales, the method comprising:

providing a plurality of weigh sites located remotely from one another, each of the weigh sites adapted for weighing vehicles;

initiating a weigh cycle at one of the weigh sites;

acquiring images of the vehicles using a plurality of image sensors positioned at one of the weigh sites, including a first camera and a second camera located at opposite ends of the scale, in order to allow a weighmaster located at a central location to verify proper vehicle placement in facilitating the weigh cycle of the vehicle, and a third camera located on a transverse side of the scale between the opposing sides of the scale, wherein at least two of the first, second, and third cameras are located proximate to the scale and oriented to provide a field of view restricted substantially to a vehicle's position relative to the scale;

establishing bi-directional live communication between a driver of the vehicle and the weighmaster;

sending the images of the vehicle from the one of the weigh sites to the central location;

displaying the images of the vehicle on a display at the central location for viewing by the weighmaster ;

receiving verification from the weighmaster that the placement of the vehicle is proper;

weighing the vehicle;

downloading weight information to the central location; and dispensing a certificate of weight, by a weight unit at the weigh site.

27. The method of claim 26 wherein the step delegating a weighmaster includes selecting from a plurality of weighmasters one available for a customer.

28. The method of claim 26 wherein the step establishing communication includes video and audio communication of the scale.

29. The method of claim 26 further comprising the step accepting payment for weighing services.

30. The method of claim 29 further comprising approving a payment.

31. The method of claim 26 further comprising the step zeroing the scale.

32. The method of claim 31 further comprising the step initializing zeroing the scale using a loop detector.

33. The method of claim 26 further comprising the step confirming from the driver the correct weighment type.

* * * * *